US008433716B2

(12) United States Patent
Wolf et al.

(10) Patent No.: US 8,433,716 B2
(45) Date of Patent: Apr. 30, 2013

(54) RUNTIME QUERY MODIFICATION IN DATA STREAM MANAGEMENT

(75) Inventors: Bernhard Wolf, Dresden (DE); Martin Rosjat, Dresden (DE); Michael Ameling, Dresden (DE)

(73) Assignee: SAP AG, Walldorf (DE)

( * ) Notice: Subject to any disclaimer, the term of this patent is extended or adjusted under 35 U.S.C. 154(b) by 536 days.

(21) Appl. No.: 12/550,505

(22) Filed: Aug. 31, 2009

(65) Prior Publication Data

US 2011/0055239 A1 Mar. 3, 2011

(51) Int. Cl.
*G06F 7/00* (2006.01)
*G06F 17/30* (2006.01)

(52) U.S. Cl.
USPC ............ 707/758; 707/759; 707/713; 709/231

(58) Field of Classification Search .................... None
See application file for complete search history.

(56) References Cited

U.S. PATENT DOCUMENTS

| 7,673,065 | B2 * | 3/2010 | Srinivasan et al. ............ 709/231 |
| 2008/0114787 | A1 * | 5/2008 | Kashiyama et al. .......... 707/100 |
| 2009/0106198 | A1 * | 4/2009 | Srinivasan et al. ................ 707/3 |
| 2010/0138438 | A1 * | 6/2010 | Torikai et al. .................. 707/759 |
| 2010/0153363 | A1 * | 6/2010 | Suzuki et al. .................. 707/720 |
| 2010/0262862 | A1 * | 10/2010 | Watanabe et al. ............... 714/19 |

OTHER PUBLICATIONS

Utkarsh Srivastava, "Flexible Time Management in Data Stream Systems", Stanford University, usriv@cs.stanford.edu.*
Harri, et al, "Processing of Data Streams with Prediction Functions", Proceedings of the 39th Hawaii International Conference on System Sciences, 2006, 10 pages.
Wolf, et al, "A Dynamic OSGi-based Data Stream System", MDS'08, Dec. 1, 2008, 6 pages.
Babcock, et al, "Models and Issues in Data Stream Systems", Proceedings of the twenty-first ACM SIGMOD-SIGACT-SIGART symposium on Principles of database systems, 2002, 30 pages.
Grimes, "Data Streams, Complex Events, and BI", International Data Warehouse and Business Intelligence Summit, Jun. 2008, 52 pages.
Golab, et al, "Issues in Data Stream Management", SIGMOD Record, vol. 32, Issue 2, Jun. 2003, pp. 5-14.
Appavoo, et al, "Enabling Autonomic Behavior in Systems Software with Hot Swapping", IM Systems Journal, vol. 42, No. 1, 2003, 17 pages.
Gama, et al, "Learning from Data Streams: Processing Techniques in Sensor Networks", Springer Berlin Heidelberg, 2007, 244 pages.
Gray, et al, "The Dangers of Replication and a Solution", 1996 ACM SIGMOD Conference at Montreal, Technical Report MSR-TR-96-17, May 1996, 12 pages.
Hjalmtysson, et al, "Dynamic C++ Classes: A Lightweight Mechanism to Update Code in a Running Program", Proceedings of the USENIX Annual Technical Conference, Jun. 1998, 13 pages.

* cited by examiner

*Primary Examiner* — Kuen S Lu
*Assistant Examiner* — Loan T Nguyen
(74) *Attorney, Agent, or Firm* — Brake Hughes Bellermann LLP

(57) ABSTRACT

A query may execute on stored original stream data obtained from stream data received from at least one data source. The original stream data may be deleted in association with new stream data being received. At least one operator of the query may be duplicated to obtain at least one duplicated operator, and the stored original stream data may be duplicated to obtain duplicated stream data. The at least one duplicated operator may be modified to obtain at least one modified operator and, thereby, a modified query. Original results may be determined based on execution of the at least one operator, and modified results may be determined based on execution of the at least one modified operator. The at least one operator and the original stream data may be replaced with the at least one duplicated operator and the duplicated stream data, to thereby obtain an integrated query for execution.

21 Claims, 10 Drawing Sheets

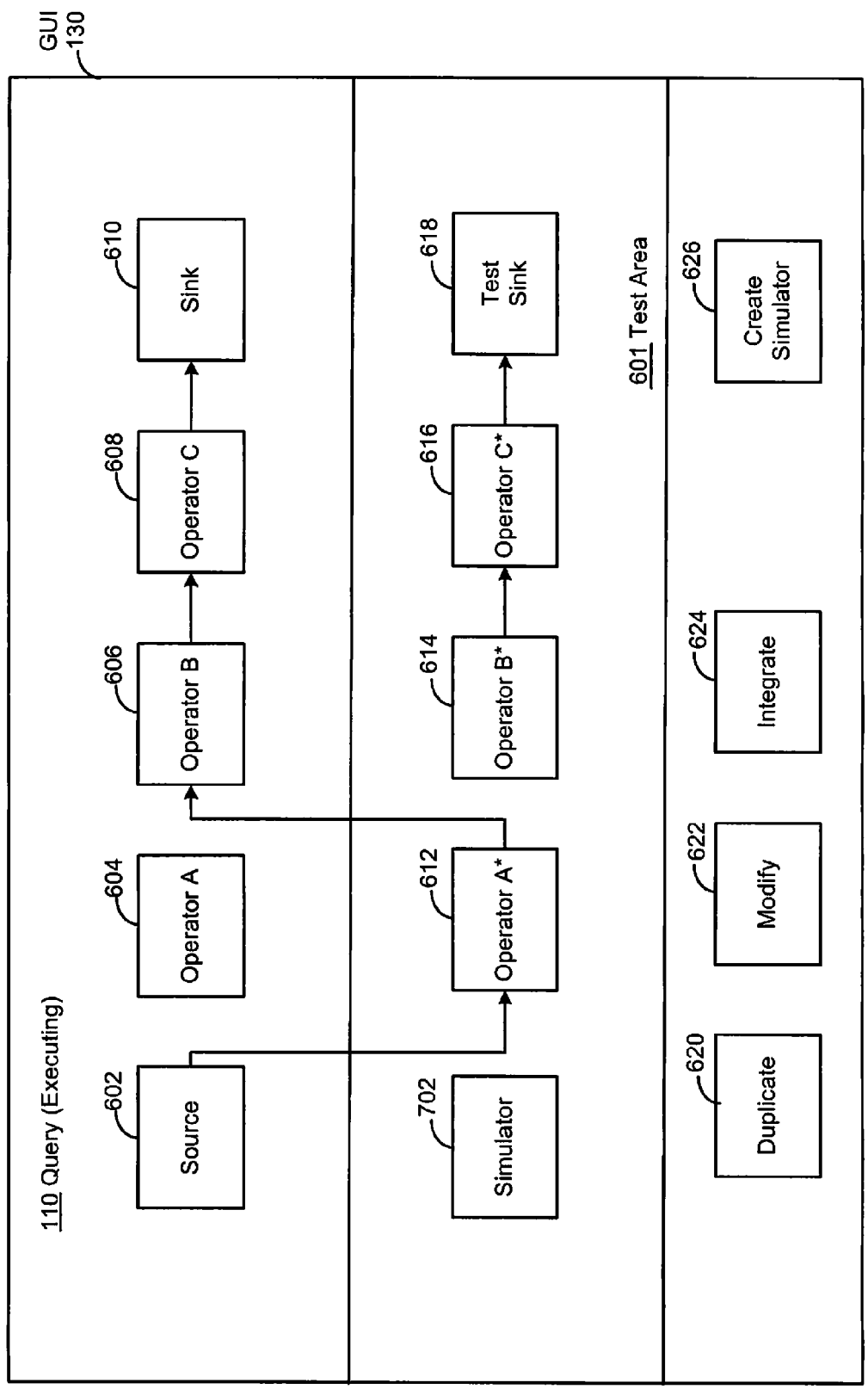

RUNTIME QUERY MODIFICATION IN DATA STREAM MANAGEMENT

TECHNICAL FIELD

This description relates to data stream management.

BACKGROUND

In traditional databases and data management systems, data is stored in an essentially static form within one or more computer memories. That is, the data may generally be altered when desired, but at any given moment the stored data represents a discrete, static, finite, persistent data set against which, e.g., queries may be issued.

In many settings, however, data may not be effectively or usefully managed in this way. In particular, it may occur that data arrives essentially continuously, as a stream of data points corresponding, e.g., to real-world events. Data stream management systems (DSMS) have been developed to make use of such data.

For example, data representing events within a manufacturing facility may fluctuate over the course of a day and/or over the lifetime of equipment within the facility. Such data may provide insight into an operational status of the facility, in order to optimize such operations. Additional/alternative examples of such data streams include temperature or other environmental data collected by sensors, computer network analytics, patient health data, or data describing business process(es).

During runtime, pre-stored queries may be applied against the data as the data arrives. For example, a portion of the data may be temporarily stored and the queries applied against the stored data portion before the stored data portion is deleted from storage. However, if the queries must be modified, then conventional systems must generally restart with the new queries. The stored data portion is then unavailable or erased, so that new data must be collected before the new queries may be applied. This may result in a harmful delay and/or related difficulties for the user of the DSMS.

SUMMARY

According to one general aspect, a computer system may include instructions recorded on a computer-readable medium. The system may include a request handler configured to determine a query of a Data Stream Management System (DSMS), the query using original stream data stored in a buffer associated with the query, the stored original stream data being obtained from stream data received from at least one data source and being removed from the buffer in association with new stream data being received, wherein the query includes at least one operator being configured to execute the query within the DSMS. The system may further include a duplication manager configured to duplicate the at least one operator to obtain at least one duplicated operator, and configured to duplicate the stored original stream data to obtain duplicated stream data for storage within a duplication buffer. The system may include a modification manager configured to modify the at least one duplicated operator to obtain at least one modified operator and to thereby obtain a modified query, and an execution manager configured to determine original results based on execution of the at least one operator, and configured to determine modified results based on execution of the at least one modified operator. The system also may include an integration manager configured to replace the at least one operator and the original stream data with the at least one duplicated operator and the duplicated stream data, respectively, based on the modified results and the original results, to thereby obtain an integrated query for execution within the DSMS.

According to another general aspect, a query of a Data Stream Management System (DSMS) may be determined, the query using original stream data stored within a buffer associated with the query, the stored original stream data being obtained from stream data received from at least one data source and being removed from the buffer in association with new stream data being received. The query may include at least one operator being configured to execute the query within the DSMS. The at least one operator may be duplicated to obtain at least one duplicated operator, and the stored original stream data may be duplicated to obtain duplicated stream data for storage within a duplication buffer. The at least one duplicated operator may be modified to obtain at least one modified operator and to thereby obtain a modified query. Original results may be determined based on execution of the at least one operator, and modified results may be determined based on execution of the at least one modified operator. The at least one operator and the original stream data may be replaced with the at least one duplicated operator and the duplicated stream data, respectively, based on the modified results and the original results, to thereby obtain an integrated query for execution within the DSMS.

According to another general aspect, a computer program product may be tangibly embodied on a computer-readable medium and may comprise instructions that, when executed, are configured to cause a data processing apparatus to determine a query of a Data Stream Management System (DSMS), the query using original stream data stored within a buffer associated with the query, the stored original stream data being obtained from stream data received from at least one data source and being removed from the buffer in association with new stream data being received, wherein the query includes at least one operator being configured to execute the query within the DSMS. The instructions, when executed, may further cause the data processing apparatus to duplicate the at least one operator to obtain at least one duplicated operator, duplicate the stored original stream data to obtain duplicated stream data for storage within a duplication buffer, modify the at least one duplicated operator to obtain at least one modified operator and to thereby obtain a modified query, determine original results based on execution of the at least one operator, determine modified results based on execution of the at least one modified operator, and replace the at least one operator and the original stream data with the at least one duplicated operator and the duplicated stream data, respectively, based on the modified results and the original results, to thereby obtain an integrated query for execution within the DSMS.

The details of one or more implementations are set forth in the accompanying drawings and the description below. Other features will be apparent from the description and drawings, and from the claims.

BRIEF DESCRIPTION OF THE DRAWINGS

FIG. 10 is a fifth screenshot of a graphical user interface that may be used with the systems of FIGS. 1 and 4.

DETAILED DESCRIPTION

Figure 1:
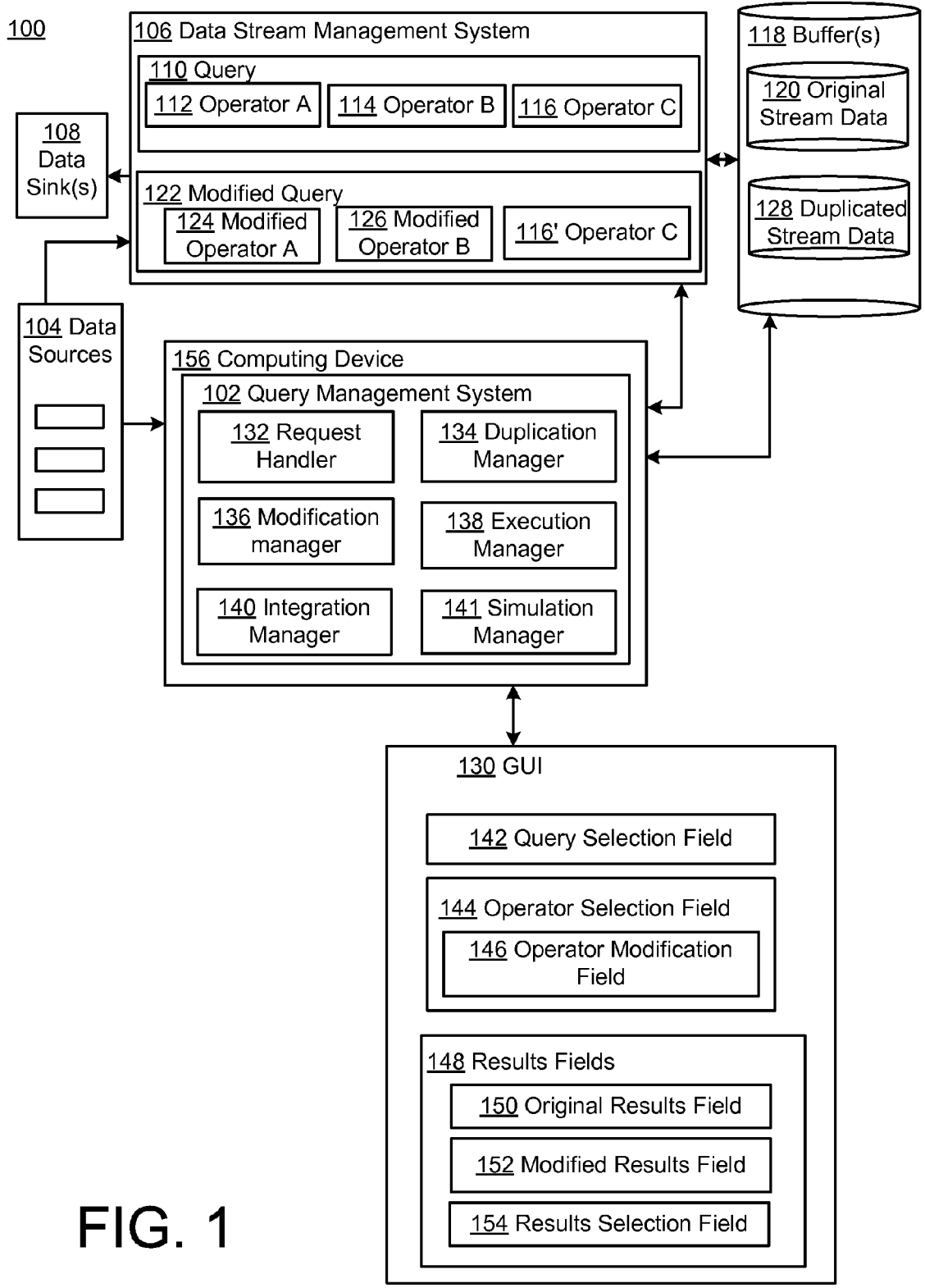
FIG. 1 is a block diagram of a system for runtime query modification in event stream data management.

FIG. 1 is a block diagram of a system 100 for runtime query modification in data stream management. In the example of FIG. 1, a query management system 102 provides a middleware between data sources 104 and a data stream management system (DSMS) 106, to thereby provide timely and accurate information to data sinks 108. More specifically, the query management system 102 provides for modification of a query 110 of the DSMS during a runtime or execution/application of the query 110 against stream data received from the data sources 104. As described in detail below, the query management system 102 is configured to preserve and utilize valuable state information associated with the data sources 104 and the query 110 during the runtime modification of the query 110. In this way, for example, the query management system 102 reduces or eliminates a downtime of the system 100 and makes timely and efficient use of already-available data, so that a user of the system 100 does not waste time and risk expenses and/or other dangers associated with a restart or re-initialization of the system 100 (and associated reacquisition of data from data sources 104).

In FIG. 1, the DSMS 106 may represent a modified, conventional, or substantially conventional DSMS. Thus, the DSMS 106 also may represent or otherwise be referred to using other known names, such as, e.g., (BEPS) business event processing system, SPE (Stream Processing Engine), or CEP (Complex Event Processing). In any case, the DSMS 106 may be understood to represent a system which receives or otherwise interacts with stream data of the one or more stream data source(s) 104.

As referenced above, such data streams are known to exist in a variety of circumstances and settings. To give just a few examples, the data sources 104 may output data streams representing or related to (events occurring within or with respect to) network monitoring, network traffic engineering, telecom call records, financial applications, sensor networks, manufacturing processes, web logs and click streams, and massive data sets which are streamed as a way of handling the large volume of data. Such data streams may thus arise in enterprises (large or small), within and across government agencies, large science-related collaborations, libraries (digital or otherwise), battlefields, or in "smart" homes. As is known, such data stream(s) may be continuous, unbounded, rapid, noisy, and time-varying.

The query 110 may represent a query that is pre-formulated during a design time for the system 100 and that includes a plurality of operators 112, 114, 116 which execute in collaboration with one another (e.g., in a sequence in the example of FIG. 1) in order to execute the larger query 110. Of course, this is just a non-limiting example, and operators of the query 110 may execute in parallel to one another, or conditionally upon completion of prior operators, or in loops, or using any other known arrangement or collaboration.

Although in FIG. 1 the query 110 is illustrated as part of the DSMS 106, it may be appreciated that the query 110 may be associated with (e.g., obtained from) a separate application, such as, for example, a Enterprise Resource Planning (ERP) application, a Customer Relationship Management (CRM) application, or an application for managing a warehouse, manufacturing facility, or other facility. As described below, such applications may be associated with, or represented by, one or more of the data sinks 108.

The query 110 may thus be received from a user or other system/service, and streamed results of the application of the query 110 against the stream data of the sources 104 may be provided to the data sinks 108. The query 110 may be executed against stream data received from data stream source(s) 104, which is shown in FIG. 1 as being received at the DSMS 106 and/or the query management system 102, as described in detail below.

As shown, at least some of the stream data may be stored in one or more buffer(s) 118. For example, as is known, it is often useful to consider the stream data received from the data sources 104 using discrete window(s). In this context, the term window may refer to a discrete, defined section or portion of the received data stream(s) over which (or against which) the user desires the query 110 to be evaluated. A window thus specifies a finite set of recent events, items, or other discrete elements (also sometimes referred to herein as "tuples" or "data tuples") from the otherwise-unbounded data stream. This finite portion of the stream data may subsequently be used to evaluate the query 110 and produce results corresponding to a particular time instant(s) or period(s). Then, as time advances, fresh items/events may be included into the window at the expense of older tuples that stop taking part in computations (and perhaps may get discarded altogether). In general, windows may be desired to evolve in a prescribed mode keeping up with the continuous arrival of data items. For example, a simple window on a received data stream may specify "the most-recent 10 events" or "all the events in the last 10 seconds," or "all events occurring between an event of type 1 and an event of type 2." Aside from such simple examples, it may be appreciated that there are many types of windows which may be specified, and such windows may change or update over time or in response to some event or some other criteria.

Consequently, content(s) of at least some of the buffer(s) 118 may represent most-recent values of the stream data received from the data sources 104, where such values are understood to be collected over an amount of time associated with a defined window. In many uses or instances of the system 100, such collected values may represent valuable information characterizing the data sources 104 (or elements or items associated with the data sources 104).

For example, as referenced above, it may occur that the system 100 is implemented in conjunction with a manufacturing facility in which some consumer item (e.g., an automobile) is constructed for shipment. The system 100 may be used to optimize an operation of such a facility by, for example, predicting an imminent malfunction within the facility. In this way, repair or replacement of potentially faulty equipment may occur prior to an actual breakdown or other malfunction of such equipment, so that downtime of the manufacturing facility is minimized.

For example, the data sources 104 may represent or include a plurality of sensors distributed within the manufacturing facility and configured to measure or otherwise sense some pre-defined operation or condition of the manufacturing facility. For example, such sensors may measure an operating temperature of the facility or of a particular piece of equipment therein, or may be configured to count a number of operations or uses of such equipment, or to detect an undesired operation of such equipment associated with an imminent failure thereof.

Then, the stream data may include such information and, at a given point in time, a window of such data may be stored in the buffer(s) 118. Consequently, such stored data may include valuable information relevant to predicting a possible imminent failure within the facility, such as abnormally high temperatures or other predictive events.

Meanwhile, during operation of the system 100, it may occur that the query 110 or parameters/operations thereof may need or be desired to be changed, e.g., in order to obtain more accurate, more complete, or more predictive results. For example, the window size (or other characteristic thereof) may be changed, or a new sensor of the data sources 104 may need to be considered by the query 110, or a current sensor removed. Other examples of query modifications are described below, and/or would be apparent to an artisan of ordinary skill.

In general, though, it may be appreciated that during runtime of the system 100, a simple re-start and/or re-initialization of the system 100 may be used in order to replace the query 110 with a new/modified query. That is, for example, current values within the buffer 118 may be erased and new values may begin to be collected according to the new query. When a sufficient number of such new values are collected, execution of the new query may begin/resume.

Such an implementation(s), although possibly useful in some contexts, may be problematic in situations such as those referenced above. For example, erasing the values within the buffer(s) 118 may result in the loss of valuable information useful in predicting the possible failure(s) within the manufacturing facility (such as the temperature fluctuations mentioned above). In taking the time to recollect new data values, the failure that otherwise would have been predicted may occur, thereby rendering the need for the query modification moot and incurring delays, expenses, and other difficulties for the operator of the manufacturing facility.

In these and similar/related scenarios, the query management system 102 may be used to provide a runtime modification of the query 110 which maintains the valuable collected data/state information within the buffer(s) 118, which is illustrated in FIG. 1 as original stream data 120. The query management system 102 thereby provides for uninterrupted service/operation of the system 100, and reduces downtime of the system 100 and the underlying facility/location (e.g., the manufacturing facility in the example above), without sacrificing data or analysis thereof.

More specifically, the system 100 provides for implementation of a modified query 122 having its own operators 124, 126, and 116'. That is, the operator 124 is a modified operator of the operator A 112 of the query 110, while the modified operator 126 is a modified operator of the operator B 114 of the query 110. In the example shown, the operator 116 is the same as the corresponding operator C 116, but is illustrated as 116' for clarity and to illustrate that an input/output thereof will be different than the underlying operator C 116 due at least to the modifications of the operators 124, 126. The modified query 122 executes, at least initially, in parallel with the query 110, and ultimately the modified query 122 (or portions thereof) may replace the query 110 (or portions thereof) without loss of the state data of the query 110. For example, as may be understood from the examples below, the modified operators 124, 126 may be integrated into the query 110 in place of the operators 112, 114.

In example operations, the query management system 102 may duplicate the query 110, e.g., including some or all of the original stream data 120 as duplicated stream data 128, and also provides for modification of the operators 112, 114 to obtain the modified operators 124, 126. Then, as just referenced, the system 100 provides for the parallel operation of the query 110 and the modified query 122. For example, as explained in detail below, the modified query 122 may be evaluated using simulated data corresponding to the data sources 104 and/or using the duplicated stream data 128.

It may be appreciated from the present description that the duplicated stream data 128 may correspond to requirements of the modified query 122 and/or operators thereof. For example, as referenced above and hereinbelow, it may occur that the modified query 122, including the operator 124, may be associated with a longer/larger window of data than that of the query 110. In this case, in addition to duplicating the original stream data 120, the query management system 102 may modify the size of the buffer 128 relative to the buffer 120, so as to accommodate the specified larger window size, i.e., in this example, by collecting and keeping more data before deleting prior-received data.

While operating in parallel, the query 110 and the modified query 122 may be evaluated (e.g., results thereof may be compared relative to one another). If and when the results of the modified query 122 are determined to represent an improvement relative to the results of the original query 110 (or according to some other criteria), then the query management system 102 may reintegrate the modified query 122 (or portions thereof, such as the modified operators 124, 126) into the original query 110 (or portions thereof, e.g., replacing the original operators 112, 114, which may themselves then be kept or discarded, as desired).

In the example implementation of FIG. 1, a user of the system 100 may use a graphical user interface (GUI) 130 to manage or otherwise access the query management system 102. For example, the user may use the GUI 130 to initially design the query 110 during a design time of the system 100, and to observe results of the query 110 as provided by the DSMS 106. In this sense, the GUI 130 may be understood to represent an example of one of the data sinks 108.

During runtime of the query 110, as referenced above, the user may wish to change the query 110, without losing the valuable, already-collected state information associated therewith, as stored within the buffer(s) 118 (e.g., the original stream data 120). Within the query management system 102, a request handler 132 may interact with the GUI 130 and receive the user's request to change the query 110. That is, the request handler 132 may be configured to determine the query 110 of the DSMS 106, the query 110 currently being executed using stored original stream data 120 within a buffer 118 associated with the query 110 (e.g., associated with individual operators thereof). As already described, the stored original stream data 120 is assumed to be obtained from original stream data periodically received from at least one of the data sources 104, and periodically removed from the buffer 120 as new original stream data is received. Based, e.g., on the request from the GUI 130, the request handler 132 may be further configured to determine at least one operator(s) 112, 114 of a plurality of operators 112, 114, 116 of the query 110, the plurality of operators being configured to execute the query 110 collaboratively within the DSMS 106.

A duplication manager 134 may be configured to duplicate the at least one operator (e.g., 112, or 114) to obtain at least one duplicated operator, and may be configured to duplicate the stored original stream data 120 to obtain duplicated stream data 128 for storage within a duplicated buffer. In the example of FIG. 1, the duplication manager 134 may duplicate some or all of the query 110, such as by duplicating operators 112, 114, 116 from within the query 110.

A modification manager 136 may be configured to modify the at least one duplicated operator to obtain at the least one modified operator(s) 124, 126 and to thereby obtain the modified query 122. For example, the modification manager 136 may be configured to receive, e.g., from the request handler 132, the type and extent of modifications desired by the user, such as, e.g., modification of the duplicated operators with respect to their order, parameters, and/or internal algorithms. As a result, the modified query 122 may include the modified operators 124, 126, as well as the (duplicated) operator 116'.

An execution manager 138 may be configured to provide original results based on execution of the original operators 112, 114, 116 using the original stream data 120, and may be configured to provide modified results based on execution of the modified operators 124, 126, using either simulated data and/or using the duplicated stream data 128 from the duplicated buffer. In some implementations, the query 110 may be duplicated exactly and executed using the same simulated data as the modified query 122, so that results of the (duplicated) original query 110' (not shown specifically in FIG. 1) and the modified query 122 may be compared directly/meaningfully, as discussed below and as illustrated specifically with respect to FIG. 9. Thus, in this context, it should be understood that the term "original results" refers to results obtained, e.g., using the original query 110 (or direct duplicate 110' thereof, and based on actual or simulated stream data), while the term "modified results" may refer to results obtained using the modified query 122 (based, e.g., on simulated stream data, duplicated stream data, or duplicated stream data that has been modified (e.g., extended to include a larger window size)). In any case, it may be observed that the original query 110 may continue execution using the original stream data 120, without interruption, disturbance, or delay, essentially as if no change or modification of the query 110 were being performed at all.

The execution manager 138 may interact with the DSMS 106 to monitor, detect, or otherwise determine the original results and modified results. In some implementations, the execution manager 138 may be configured to compare the original and modified results and to determine whether and when the modified results represent an improvement, or are otherwise preferable over, the original results. In other implementations, the execution manager 138 may provide the original/modified results to the GUI 130 for illustration therewith, as described in more detail, below.

An integration manager 140 may be configured to replace the operators 112, 114 and the original stream data 120 with the modified operators and the duplicated stream data 128, respectively, based on the modified results and the original results, to thereby provide an integrated query for continued execution within the DSMS, using the duplicated stream data (and modifications/extensions therof). For example, as described below, the integration manager 140 may be configured to decouple the operators 112, 114 from the data sources 104 and the operator 116, respectively, and to couple the modified operators 124, 126 in series in their place to obtain the integrated query. The replaced operators 112, 114 may then be deleted, discarded, or maintained in some other context, as desired. In other implementations, the modified query 122 may be integrated in its entirety in place of the query 110 between the data sources 104 and the data sinks 108, and may thereby represent the integrated query in its entirety.

As referenced above, in some examples, the duplication manager 134 may duplicate the query without (at least at first) duplicating the original stream data 120. Instead, a simulation manager 141 may feed simulated stream data to the modified query (e.g., to the modified operator 124), and possibly to an exact duplicate of the query 110, as well. Then, the execution manager 138 may initially compare the original results with modified results obtained in whole or in part using the simulated data. If the comparisons indicate that the modification of the query 110 was useful, beneficial, or otherwise preferable or acceptable, then the duplication manager 134 may proceed with duplicating the original stream data 120 to obtain the duplicated stream data 128 and proceeding as described above with replacing the query 110 with the modified query 122 (or portions thereof) to obtain the integrated query.

Similar scenarios involving the simulation manager 141 may be implemented, e.g., as a way to test (and optimize) various query modifications before having to execute the stream data duplication, or as a way to begin execution of the modified query 122 while waiting for the duplication of the stream data to complete. In these cases, for example, it may occur that the stream data may only be duplicated (including transfer of the stored stream data 120) during idle times of the operators 112, 114, and/or 116 (so as not to disrupt or delay execution of the query 110). Moreover, in cases where portions of the system 100 are executing on different computing devices that are in communication with one another, network or other transmission-related conditions may cause the duplication of the stream data to occur relatively slowly. In such cases, the simulated data may be used to test whether such time-consuming duplication will be a net benefit before proceeding with the duplication, and/or may be used temporarily until the duplication can be completed.

Operations of the GUI 130 are illustrated in more detail with respect to the screenshots of FIGS. 6-10. In general, FIG. 1 illustrates that the GUI 130 may include one or more screens (although only a single screen is illustrated in FIG. 1, for the sake of conciseness) to be provided to the user for executing and implementing the above operations. For example, a query selection field 142 may be provided to present a list of all executing queries, so as to allow a user to select the query 110 therefrom for being modified. Then, once the query 110 is selected, it may be duplicated automatically, and/or an operator selection (duplication) field 144 may be provided that allows the user to select the operators 112, 114, 116 for duplication. An operator modification field 146 may be provided that allows the user to implement the desired modification(s), e.g., of the operators 112, 114 to obtain the modified operators 124, 126. It may be appreciated that the request handler 132, duplication manager 134, and modification manager 136 may be used to provide, implement, and receive data from, the fields 142-146.

A results field 148 may provide, e.g., the original results in an original results field 150, and the modified results in a modified results field 152. The user may then use a results selection field 154 to select between the original and modified results, and to ultimately initiate integration of the modified operators into the originally-running query 110 to obtain the integrated query. As referenced above, the original results field 150 and/or the modified results field 152 may (at least temporarily and for purposes of comparison) represent or include simulated results (e.g., may be calculated using or based on simulated data).

In FIG. 1, the GUI 130 is just an example, and it may be understood that other query selection/modification techniques may be used (e.g., text-based interfaces). The GUI 130 may be a specialized GUI associated with the query management system 102, or may be an otherwise-standard GUI associated with one or more of the DSMS 106 and/or the data sinks 108 (e.g., an enterprise resource planning (ERP) application).

Thus, FIG. 1 provides a system(s) and method(s) for modifying running queries that are being executed against a data stream, while minimizing or eliminating downtime of the system 100 and without losing valuable state data that has already been collected by the running query. As shown in FIG. 1, the query management system 102 may be implemented on a computing device 156, which may represent virtually any conventional computing device having associated hardware (e.g., processor, memory, or display device(s)) and software needed for the implementation. Although in FIG. 1 only the query management system 102 is illustrated as being executed using the computing device 156, it may be appreciated that the DSMS 106 and/or applications associated with the data sources 104, the data sinks 108, and/or the GUI 130 may be executed thereon as well, or may be executed on separate computing devices, not specifically shown in FIG. 1. In the latter case, the various separate computing devices may be in communications with one another by way of a network, such as the Internet or a private (e.g., enterprise-wide) network. For example, the GUI 130 may run locally on a client computer, while the computing device 156 may represent a remote server computer executing both the query management system 102 and the DSMS 106. Other configurations would be apparent to one of skill in the art.

Figure 2:
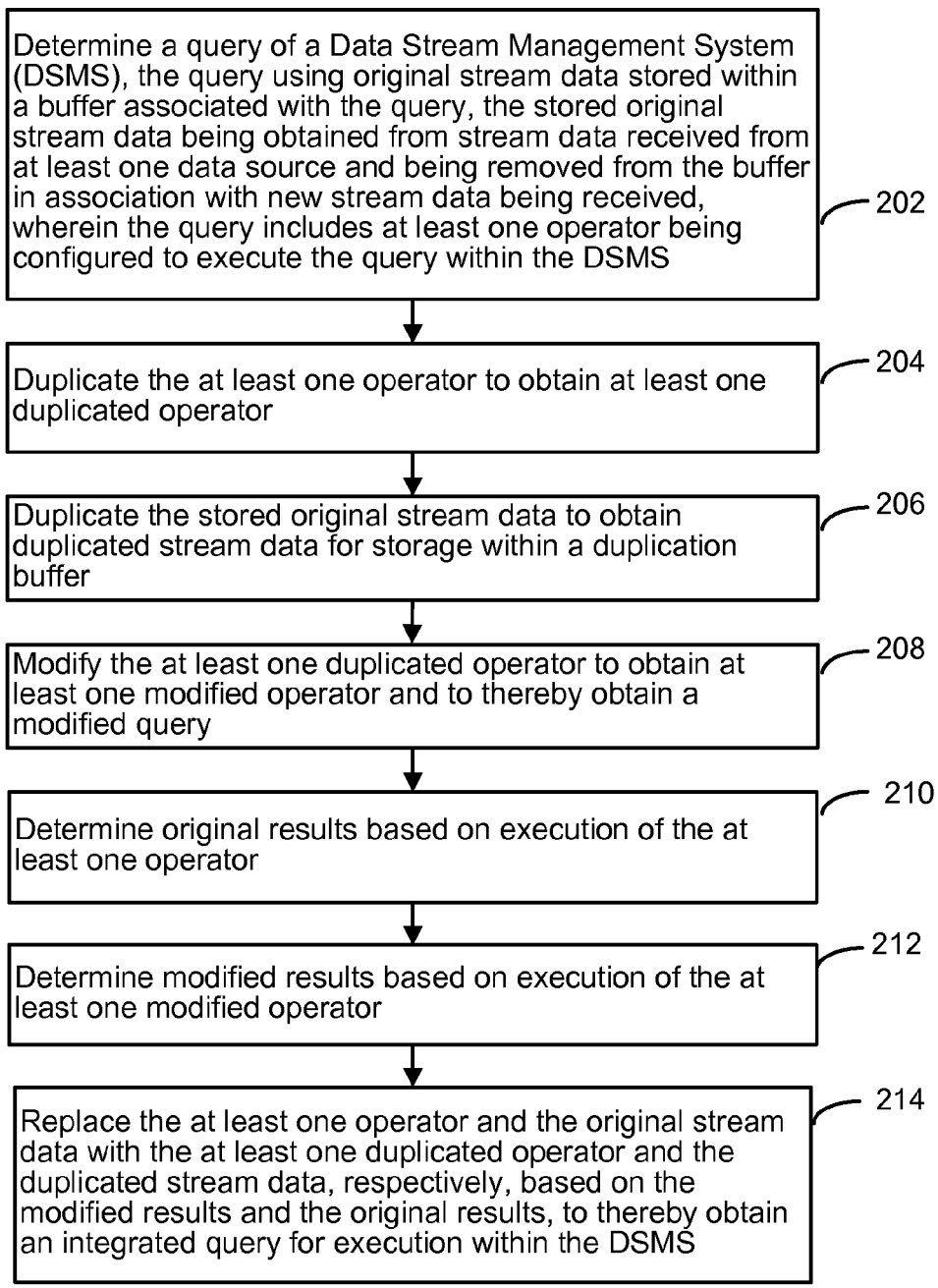
FIG. 2 is a flowchart illustrating example operations of the system of FIG.

FIG. 2 is a flowchart 200 illustrating example operations of the system of FIG. 1. In FIG. 2, operations are illustrated in a sequential order. However, it may be appreciated that such illustration is for the sake of example, and, if not otherwise required, operations may in fact be performed wholly or partially in parallel or in an overlapping (e.g., combined) fashion, or in a different order than that shown.

In the example of FIG. 2, a query of a Data Stream Management System (DSMS) may be determined (202), the query using original stream data stored within a buffer associated with the query, the stored original stream data being obtained from stream data received from at least one data source and being removed from the buffer in association with new stream data being received, wherein the query includes at least one operator being configured to execute the query within the DSMS. For example, as described with respect to FIG. 1, the request handler 132 may receive a selection of the query 110 and/or of the operators 112, 114, e.g., by way of the selection fields 142, 144 of the GUI 130, where, as described, the query 110 may be executed using the original stream data 120.

The at least one operator may be duplicated to obtain at least one duplicated operator (204). For example, the duplication manager 134 may be configured to duplicate the query 110, e.g., based on the selection of one or more of the fields 142, 144.

The stored original stream data may be duplicated to obtain duplicated stream data for storage within a duplication buffer (206). For example, the duplication manager may include the duplication of the original stream data 120 to obtain the duplicated stream data 128 when duplicating the operator(s) to obtain the duplicated operator(s), or such duplication may occur at a later time. For example, as described herein, such duplication may be easily accomplished, such as when the system 100 executes primarily or completely on a single computing device (e.g., the computing device 156). In other examples, such duplication may be more problematic and/or time-consuming, in which case the duplication of the original stream data 120 may be delayed until after simulated stream data is used to confirm that the duplicated/modified/integrated query will provide modified results demonstrating a net benefit that is worth the cost of executing the duplication.

The at least one duplicated operator may be modified to obtain at least one modified operator and to thereby obtain a modified query (208). For example, the modification manager 136 may be configured to provide a modification of the corresponding duplicated operators to obtain the modified operators 124, 126. It may be appreciated that the duplication and modification operations may be performed as a single operation. The modifications may include, for example, changing an algorithm executed by or associated with one or more operators, adding a new operator or deleting an existing operator (with or without corresponding addition of a new/replacement operator), or changing an order of operator(s). In some example implementations, the duplicated operator may be modified, e.g., modifying a size or type of window of data to be collected within the duplicated stream data 128. In other words, the modification manager 136 may be said to provide the modified operator 124 including a specification associated therewith of a size of window used in maintaining the duplicated stream data 128, or, in still other words, may be said to modify the duplicated stream data to obtain modified stream data. Specific examples of these types of implementations are provided below, e.g., with respect to FIG. 3 and FIGS. 6-10. Moreover, other types of parameter modifications would be apparent, including, e.g., a change(s) in one or more thresholds associated with collecting or calculating data with respect to a window.

Original results may be determined based on execution of the at least one operator (210). For example, such original results may be determined by the execution manager 138 and displayed within the original results field 150 of the GUI 130. In some examples, the original results may be obtained using the original stream data 120. In other examples, as referenced herein, the simulation manager 141 may provide simulated stream data to a duplicate of the operator(s) of the query 110, in which case the original results may include (at least temporarily) original simulated results obtained from calculations of the duplicated operator performed on the simulated stream data. For example, in some example implementations, such original simulated results may be compared to corresponding modified simulated results obtained by providing the simulated stream data to the modified operator(s).

Modified results may be determined based on execution of the at least one modified operator (212). For example, the execution manager 138 may provide such modified results to the GUI 130 using the modified results field 152. As just referenced, the modified results may include modified simulated results obtained by providing the simulated stream data from the simulation manager 141 to the modified operators 124, 126, and/or may include modified results obtained by providing the duplicated stream data 128 to the modified operators 124, 126.

The at least one operator and the original stream data may be replaced with the at least one duplicated operator and the duplicated stream data, respectively, based on the modified results and the original results, to thereby obtain an integrated query for execution within the DSMS (214). For example, the user may observe the original results and modified results at the original results field 150 and the modified results field 152, and may observe that the modified results are preferable, and may indicate substitution of the original query 110 (or operators thereof) with the modified query 122 (or operators thereof). Then, the integration manager 140 may be configured to execute this integration/substitution, as described hereinbelow in more detailed example implementations.

Figure 3:
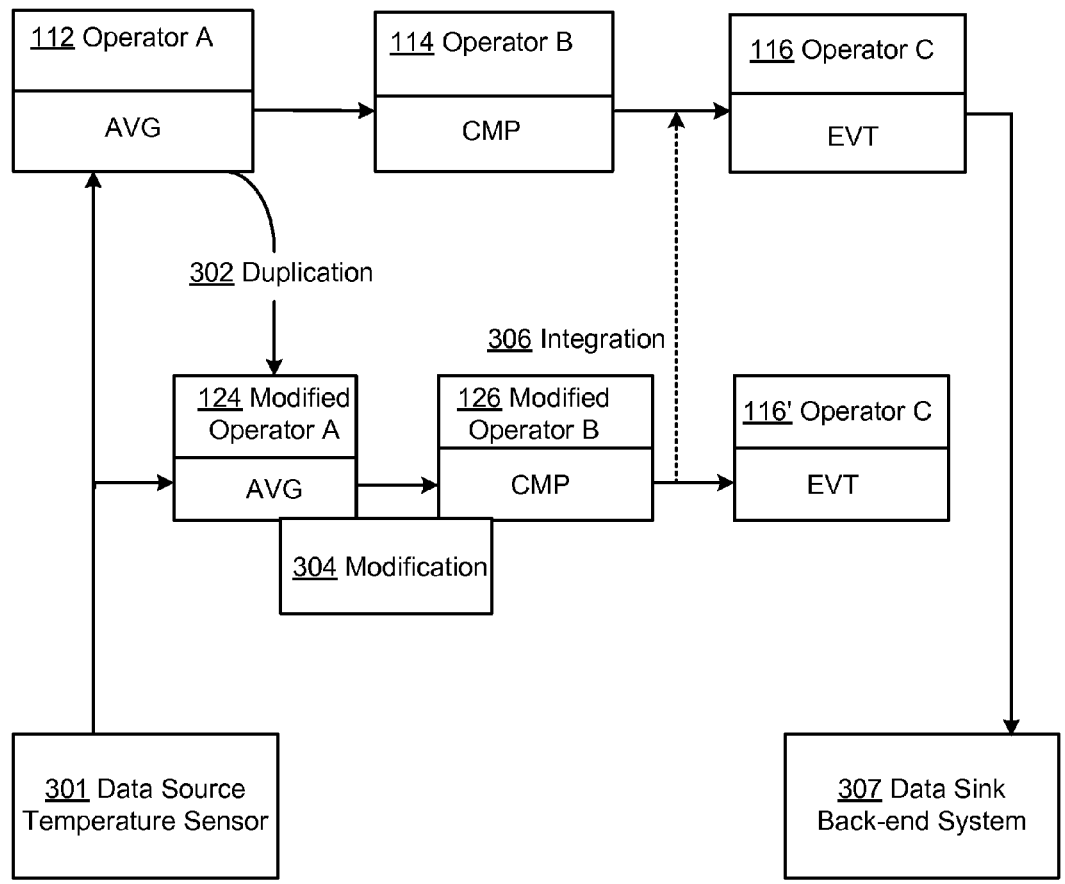
FIG. 3 is a block diagram of a query and modified query for use in the system of FIG. 1.

FIG. 3 is a block diagram of a query and modified query for use in the system of FIG. 1. More specifically, FIG. 3 illustrates a more detailed example with respect to the queries 110 and 122 of FIG. 1.

As referenced above, a potential area to gain improvements in quality and cost savings in manufacturing/production is predictive maintenance. As described, abrasive wear may be estimated by observing resources to prevent breakdowns and therewith unplanned downtimes. Process data like temperature, current consumption, or vibrations may be measured, e.g., by corresponding sensors. Using a sufficient model the current conditions of abrasive wear may be calculated. At a calculated time, tools or wearing parts are exchanged within a planned downtime. It is presumed for the example that knowledge about models, measurement, and consequences may be provided and applied by domain experts.

In FIG. 3, it is assumed that along these lines a temperature is continuously measured using a data source temperature sensor 301 and/or related software/transceivers. The temperature measurements thus represent the stream data of FIG. 1 and may be recorded in an input buffer (e.g., buffer 120 of FIG. 1) of the operator 112. The size of the buffer is limited by a parameter that effectively defines a window with respect to the incoming stream data of temperature values. With every new value, the oldest value is discarded from the buffer. Therewith a sliding window is realized. From that window, the operator 112 calculates a moving average to reduce the influence of outlier temperature values. The result is forwarded and compared to a specified threshold operator, i.e., operator 114. If the threshold is crossed, then further actions are triggered, e.g. a warning light may be switched on by operation of the operator 116. Additionally, or alternatively, relevant data may be forwarded to a connected back-end system 307 operating as a data sink (e.g., data sink back-end system 307), in order to ensure maintenance and to schedule the downtime for the maintenance.

In the example, it may occur that the sensor signal from the data source temperature sensor 301 is suddenly interfered with, e.g., by a disturbing signal that leads to larger outliers. Consequently, the result of the moving average calculation will fluctuate more, which implies that the prediction of abrasive wear is not as reliable as originally projected. Thus, the threshold at the operator 116 may be passed earlier, which implies higher costs caused by less tool utilization, and/or later, a tool malfunction.

The expert's solution may be to consider a longer time period for the moving average operation to flatten the signal. The system 100 of FIG. 1 and related implementations and variations thereof may be used to support the expert in this regard. Specifically, for example, the expert may be supported with the query management system 102 of FIG. 1, e.g., by enabling the expert to optimize new/modified operations in parallel with the runtime of the query 110.

Consequently, by operation of the query management system 102, the chain of operators 112, 114, 116 may be duplicated and ultimately modified by modification 304 in parallel with the running process. In the example of FIG. 3, duplication 302 implies duplication of the stored original stream data 120 to obtain duplicated stream data 128, i.e., the buffer is considered to be part of, or at least associated with, the operator 112. In this way, the modified operator 124 may continue processing the stream data including the duplicated stream data as well as newly-received stream data from the data source temperature sensor 301.

In this or other examples, the modified operator 124 may at least initially be operated using simulated stream data which provides an adequate simulation of the data source temperature sensor 301. It will be appreciated that such simulated data may be generated effectively instantly (e.g., in a second or less) that might take hours or days to accumulate from the data source temperature sensor 301. Hence, different window sizes (e.g., different numbers of temperature values) can be tested to select an optimum moving average. Specifically, without affecting the main system, the window size of the duplicate/modified operator can be extended to a sufficient value. It may be noted in this example that changing the window size in this manner may influence the succeeding operator, e.g., a change of the threshold may be required. Before applying the changes into the running system and replacing the original operators 112, 114, the state (input buffer and associated stream data values) may be transferred from the original operator 112 to the (modified) duplicate 124. Subsequently in this example, the real sensor may be connected to operator 124, and the connection between 126 and 116' may be switched by virtue of integration 306 so that the operator 116 receives the output of the modified operator 126 (and no longer that of the operator 114).

The window size may steadily increase until the targeted window size is reached. With that, the (re)integration process may be essentially completed. As referenced above, other ways to modify the operators 112, 114 include replacing the operator's algorithm with an advanced calculation, or introducing a new operator to optimize the functionality, e.g. an operator that detects and replaces outliers. In the latter example, the new operator may be dynamically placed in front of the operator 112/124.

When increasing the size of the sliding window, a switch to the new operation may be executed when the system 102 considers more primary data than the original operation, and therefore presumably produces more precise results. Also, different window types can be used to retrieve the targeted result faster. That is, if only windows with a fixed window size are used, then the problem may occur that a precise value may only be calculated for the first time when all slots of the window are filled with primary data. An additional method to receive (more) precise results earlier is the usage of a growing window, i.e. a landmark window. During a transition period, a window size of such a window may increase from the original to the new window size with every new value. That is, one edge may be fixed to the oldest known value, so that no values will be discarded. After the transition period a fixed size sliding window with the new length may be used.

Figure 4:
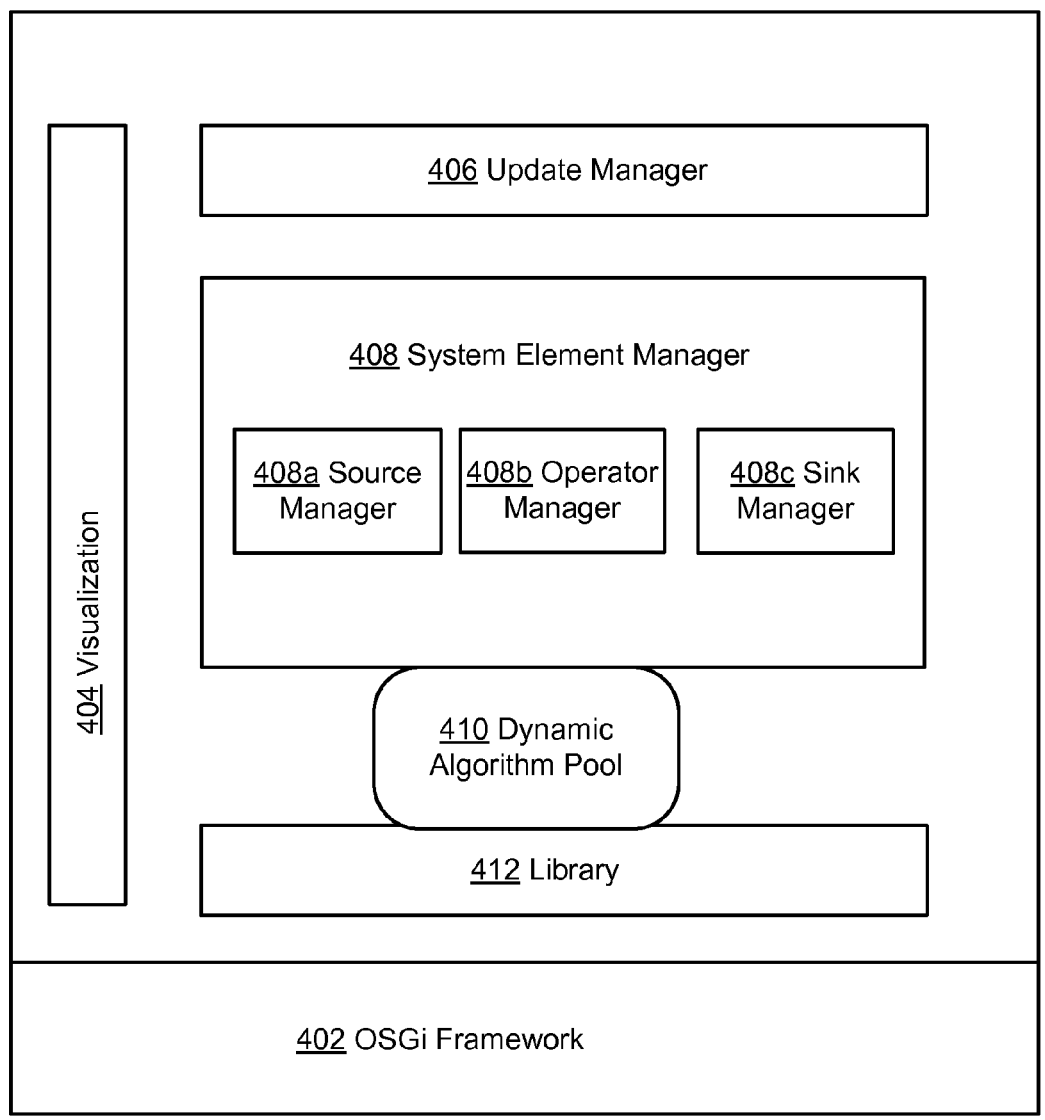
FIG. 4 is a block diagram of an alternate implementation of the system of FIG. 1.

FIG. 4 is a block diagram of an alternate implementation of the system of FIG. 1. Specifically, FIG. 4 illustrates a system 400 in which the example implementation is based on an Open Services Gateway Initiative (OSGi) platform, which is a known, Java-based framework for deploying and managing remote applications/components that may be referred to as bundles, which generally refer to software modules that can be started, stopped, and updated during runtime, and thereby enable reloading of code during runtime. In FIG. 4, a OSGi framework 402 provides a service registry for registering and requesting services, and which provides for the management of Java classes including creating new/modified instances of known classes.

Thus, further in FIG. 4, the OSGi framework 402 provides for bundles including visualization 404, an update manager 406, a system element manager 408, a dynamic algorithm pool 410, and a library 412, which are explained in more detail, below. By way of such explanation, it may be generally appreciated that the query management system 102 uses the three general types of system elements referenced above of data sources, operators, and data sinks.

As generally referenced above, a data source generally introduces raw data into the data stream system and conjoins them with a timestamp. Examples for connected endpoints are sensors, programmable logic controllers, databases, or other systems. For instance, while being connected to a sensor, the data source may take control of sensor access and be responsible for a steady connection to the sensor. Other useful data may be obtained from simulations, as already described. In this latter case, the data source retrieves data from a simulation tool or implements a simulation model itself.

A data source forwards its data to one or more connected operators for further processing or just to a data sink. An operator receives data from predecessor operator(s) and/or from data sources. Basic operators have one or two operands (inputs). Complex operators with more than two inputs may then be modeled using the basic operators. The incoming data are stored in input buffers, that have a length from one to infinite. The input buffers may be considered to be part of the inner state of an operator. To limit the amount of data being stored and also to minimize the consumption of processing power for calculation, window operators may be used, e.g., as described herein, including value-based windows, time-based windows, or event-based windows, or combinations thereof. Generally, operators have an algorithm that processes a result based on the input data. The result is provided with a timestamp and forwarded to connected operators or data sinks, e.g., in a form of a data stream.

A data sink receives data from operators or data sources, and may be responsible for an appropriate connection to the endpoint and/or sends up the received data to connected systems, like back-end systems/applications, databases, or controllers. Furthermore, user interfaces such as the GUI 130 may be provided with data using data sinks as observer(s).

A special form of data sinks are loggers, which can be used to log changes to files or databases and are able to retrieve additional data from system elements, e.g. parameters or input buffers. Loggers may require relatively more system resources and may be used temporarily to avoid scarcity of such resources. For example, one or more loggers may be associated with the GUI 130 to track more stream data and/or data associated with the various operators than would otherwise be available just from the data sinks themselves.

As referenced above, the primary system may continue to run undisturbed during operation of the query management system 102 and/or the system 400 of FIG. 4 or alternate systems. For example, during the modification procedure the original operators should not be infringed by the duplicated operators. Additionally, and similarly, the integration should take place in a transparent way. Succeeding operators may be prevented from being aware of or impacted by the modifications/integrations.

In the examples of FIGS. 1 and 4, a data-driven communication may be used, because data are sent continuously. Data may be transmitted to connected elements as soon as it arrives (or, in case of operators, as soon as a new result has been calculated). Thus, in the example of FIG. 4 (as well as possibly in the example of FIG. 1) the publish/subscribe (pub/sub) paradigm may be implemented, here within the context of the OSGi framework. The pub/sub paradigm facilitates decoupling (e.g., for integration of the modified query or operators thereof into the original query) by enabling an asynchronous communication. Additionally, pub/sub provides multicast, which may be advantageous for implementing multiple versions of duplicated/modified operators and in implementing queries with a number of branches of operators.

For example, a receiver element may subscribe to the Service Registry of the OSGi framework so as to receive data for which the receiver element (e.g., operator or data sink) is interested in specifying an interface and its identification. Filtering may be implemented using additional parameters, e.g., a query ID or a predecessor operator type/version. When new data are available, the sender element may thus search the service registry for interested receivers, based on provided parameters. The data may then be published to these receiver elements.

The format for data exchange between operators may include a generic data tuple. The tuple may contain a timestamp and a generic value. The timestamp may be used for sorting, sampling, or the validity check in time-based window operators, for example. Since in this example, the value field is generic, it may be filled with every datatype, hence, the communication is not bound to specific datatypes, which may ease system enhancements. For infrequent inquiries like retrieving the current inner state of an operator, a request/response (req/res) mechanism may be used. A request may include a set of parameters to indicate an interest in the associated data, so that the response contains the requested data.

In the specific example of FIG. 4, the library bundle 412 may contain static information like defined interfaces, system element classes, and the generic data tuple class (e.g., for including/representing one or more of event streams or XML streams). Remaining bundles 404-410 may utilize these resources.

The system element manager 408 bundle(s) may include bundles such as a source manager 408a, operator manager 408b, and sink manager 408c, and thereby controls the life cycle of data sources, operators, and data sinks, respectively. The bundles 408 (408a-408c) may be configured to register, update and unregister services at the service registry of the OSGi framework 402, depending on whether elements are needed to be introduced, updated or removed. Such registration may include specification of predecessor(s) of operators and data sinks.

The update manager 406 may be configured to take control of the execution of specific, user-triggered steps of the duplication, modification, or integration process(es). Sub-steps may be performed automatically, e.g., increasing a version number/designator with operator changes, transfer state information during integration, or switching predecessor element(s).

Inserting new functionality into the system may be done by updating the dynamic algorithm pool 410. The dynamic algorithm pool 410 may be the only bundle that is restarted in order to modify the operator(s)/query to add functionality to the (possibly running) DSMS. Meanwhile, changing the composition of operators may be realized by changing predecessors. If necessary, new operators may be created to implement new/modified algorithms. The communication between the system elements may be implemented using an OSGI-specific implementation of the pub/sub paradigm known as the whiteboard pattern, which is known to leverage the functionality of the OSGi service registry.

Figure 5:
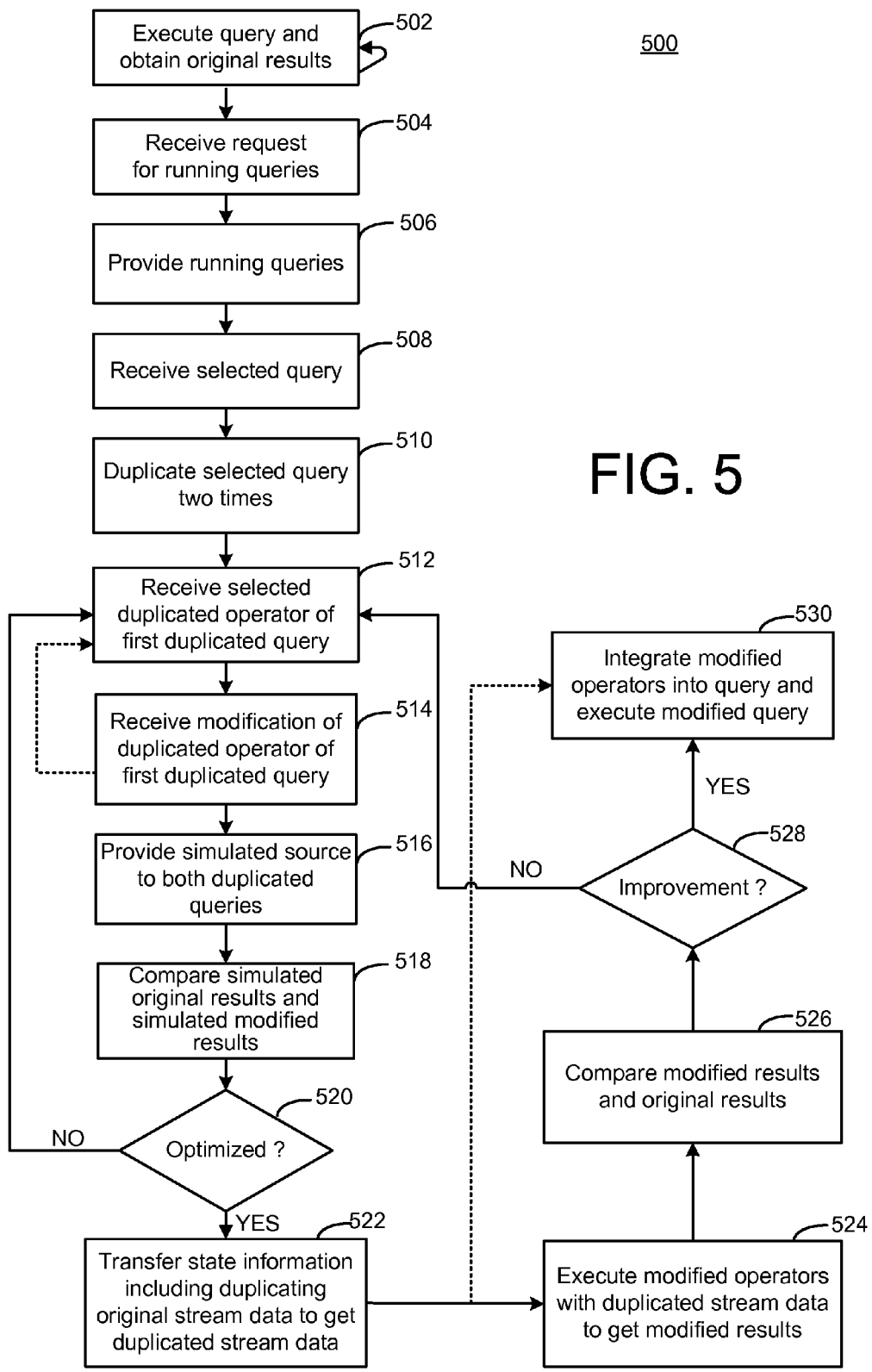
FIG. 5 is a flowchart illustrating example operations of the systems of FIGS. 1 and 4.

FIG. 5 is a flowchart 500 illustrating example operations of the systems of FIGS. 1 and 4. In the example of FIG. 5, a DSMS such as the DSMS 106 of FIG. 1 may execute a query to obtain original results (502). Such execution may continue indefinitely or as specified until a request for running queries is received (504), e.g., by way of the GUI 130 and/or visualization bundle 404. In response, a list of the running queries may be provided (506), so that a selection of one of the running queries may be received (508).

Then, the selected query may be duplicated two times (510). The second duplicated query may be maintained identically to the selected/original query, while the first duplicated query may be modified as described herein. Specifically, for example, an operator(s) of the first duplicated query may be selected (512) and then a modification thereof may be received (514).

A simulated stream data source(s) may be applied to both of the first and second duplicated queries (516). Then, simulated original results and simulated modified results may be compared (518). If the simulated modified results do not represent an optimization of the modified query, then the process may continue with additional or alternative duplications/modifications of the query and/or operators thereof (512-518). For example, operator parameters (e.g., window size) or algorithms may be altered in a further attempt to obtain optimization.

If optimization is achieved (520), the state information may be transferred from a buffer of the original operator to a buffer of the corresponding duplicated/modified operator (522). For example, the simulated stream data stored in the buffer of the duplicated/modified operator may be erased or discarded and replaced in its entirety with duplicated stream data from the original stream data of the original operator.

At this point, it is possible simply to proceed with the modified query by integrating the modified operators into the original query in place of their corresponding operators, so as to continue execution with the integrated query (530). In other words, it is possible to rely on the results/comparison of the simulated original results and the simulated modified results when deciding to proceed with the new modified/integrated query.

In other implementations, the system 100 and/or 400 may continue with executing the original stream data and the duplicated stream data in parallel to get corresponding (actual) original and modified results (524), so that these may be compared (526). Then, if a sufficient improvement is not observed when using actual collected stream data (528), the process may continue, e.g., with re-executing the duplication/modification operations in order to determine an optimized result (512-526). Otherwise, the integration and execution of the integrated query may occur (530).

Figure 6:
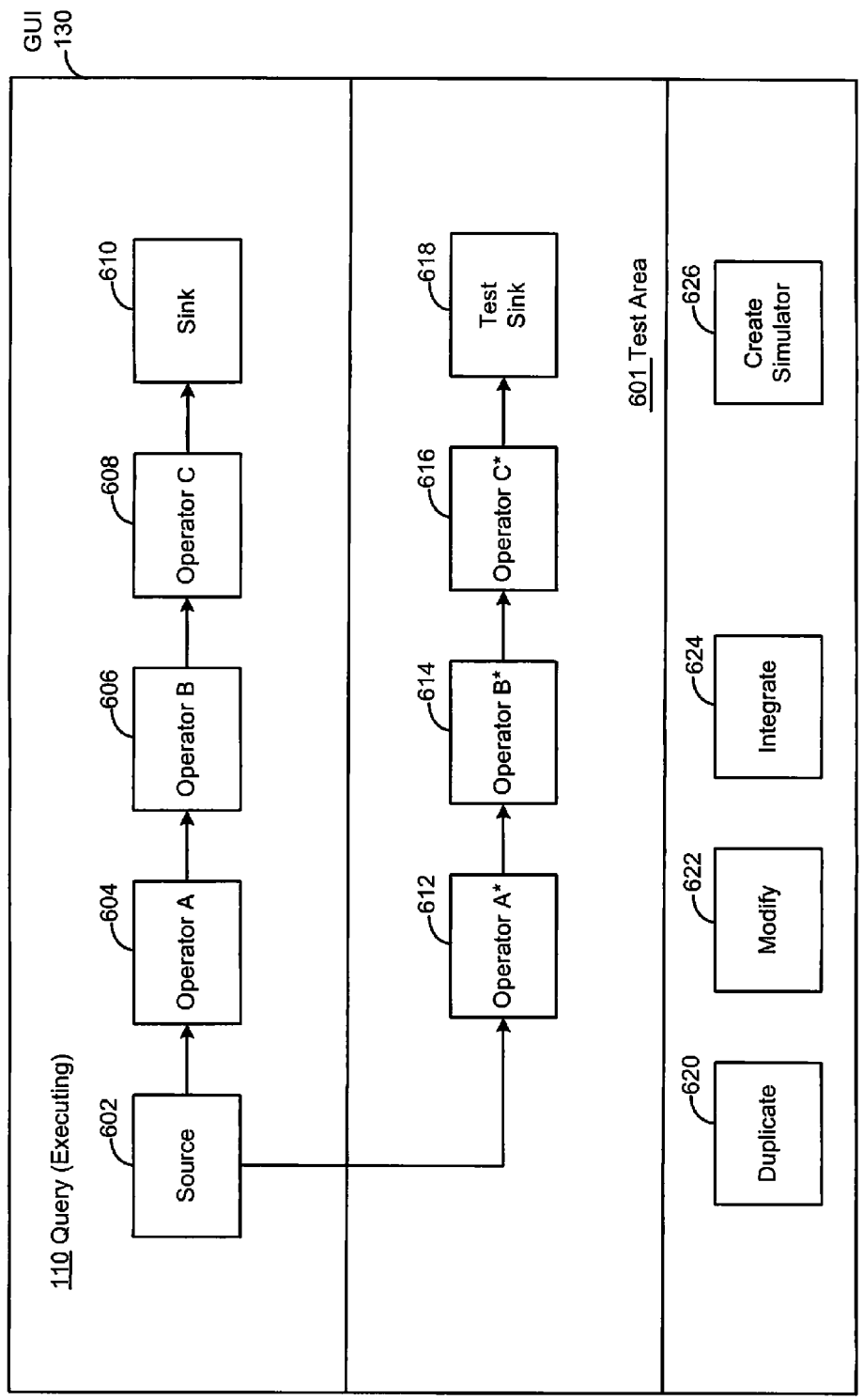
FIG. 6 is a first screenshot of a graphical user interface that may be used with the systems of FIGS. 1 and 4.

FIGS. 6-10 are example screenshots of a graphical user interface(s) that may be used with the systems of FIGS. 1 and 4, such as the GUI 130 and/or the visualization bundle 404. In FIG. 6, the GUI 130 is illustrated as including a visualization of the query 110 as it is executing within the DSMS 106. As shown in this example, the query 110 includes a source 602, operators 604-608, and a sink 610.

In operation, a user may have selected the query 110 for modification/integration, and may initially select a duplicate button 620 to duplicate the query 110 within a test area 601 to thereby obtain duplicated operators 612-616 and duplicated sink 618. As may be inferred from the example of FIG. 6, the query 110 is initially identical to its duplicate within the test area 601, so that the results should also be identical.

Further in FIG. 6, as referenced in more detail below, a modify button 622 will be used to perform modifications of the duplicated operators 612-618, as well as an integrate button 624 to execute integration of the resulting modified operators within the query 110 to obtain an integrated query. Finally in FIG. 6, a 'Create simulator' button 626 is illustrated which allows the user to create simulated stream data sources such as those already described above.

Figure 7:
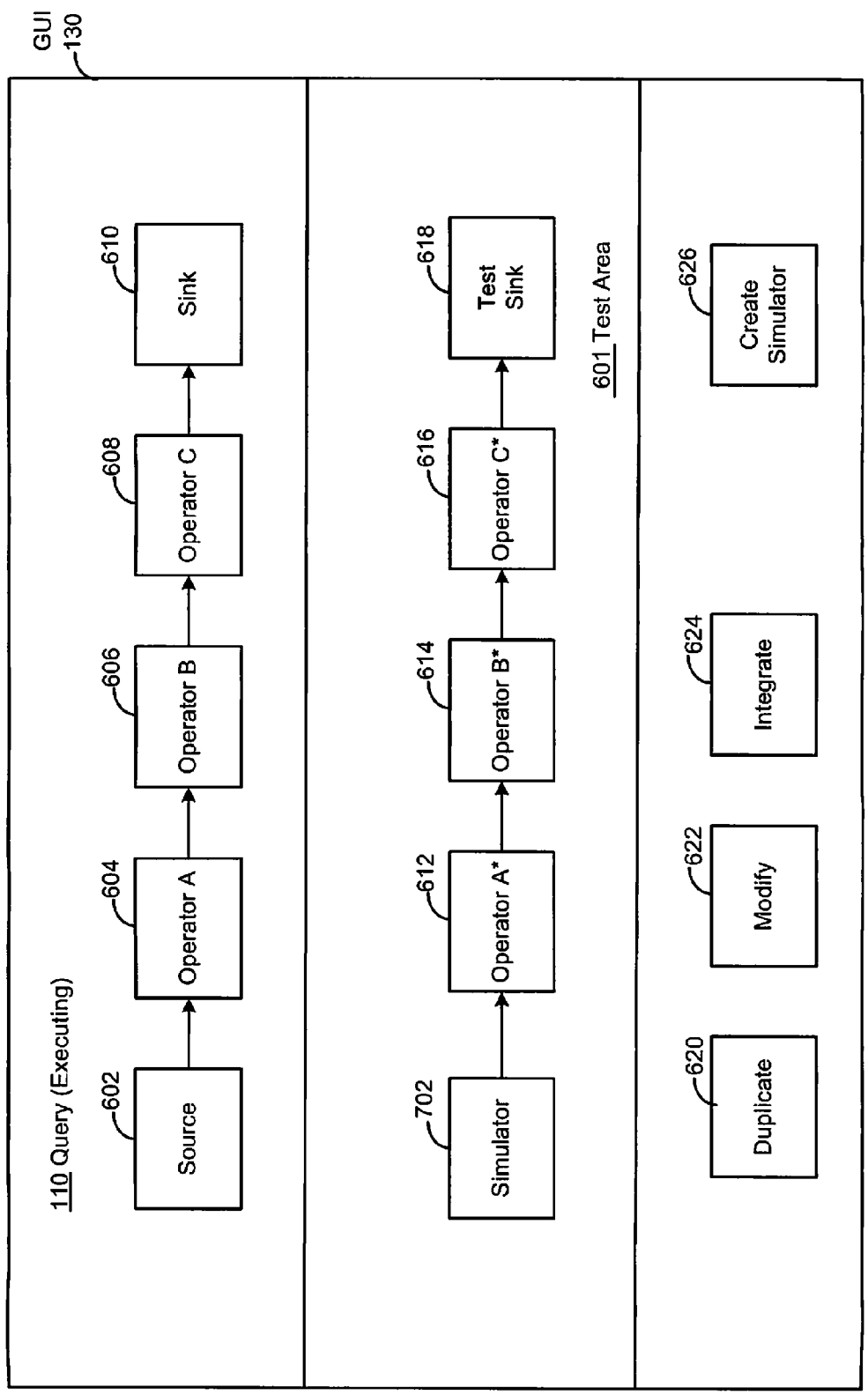
FIG. 7 is a second screenshot of a graphical user interface that may be used with the systems of FIGS. 1 and 4.

Thus, in FIG. 7, a user may select the Create simulator button 626 and create simulated stream data source 702. The user may click on or otherwise select the duplicated operator 612 in order to decouple it from the source 602 and to instead couple the duplicated operator 612 to the simulator 702 (e.g., to initiate publication of results from the simulator 702 and/or subscription of the duplicated operator 612 thereto).

Figure 8:
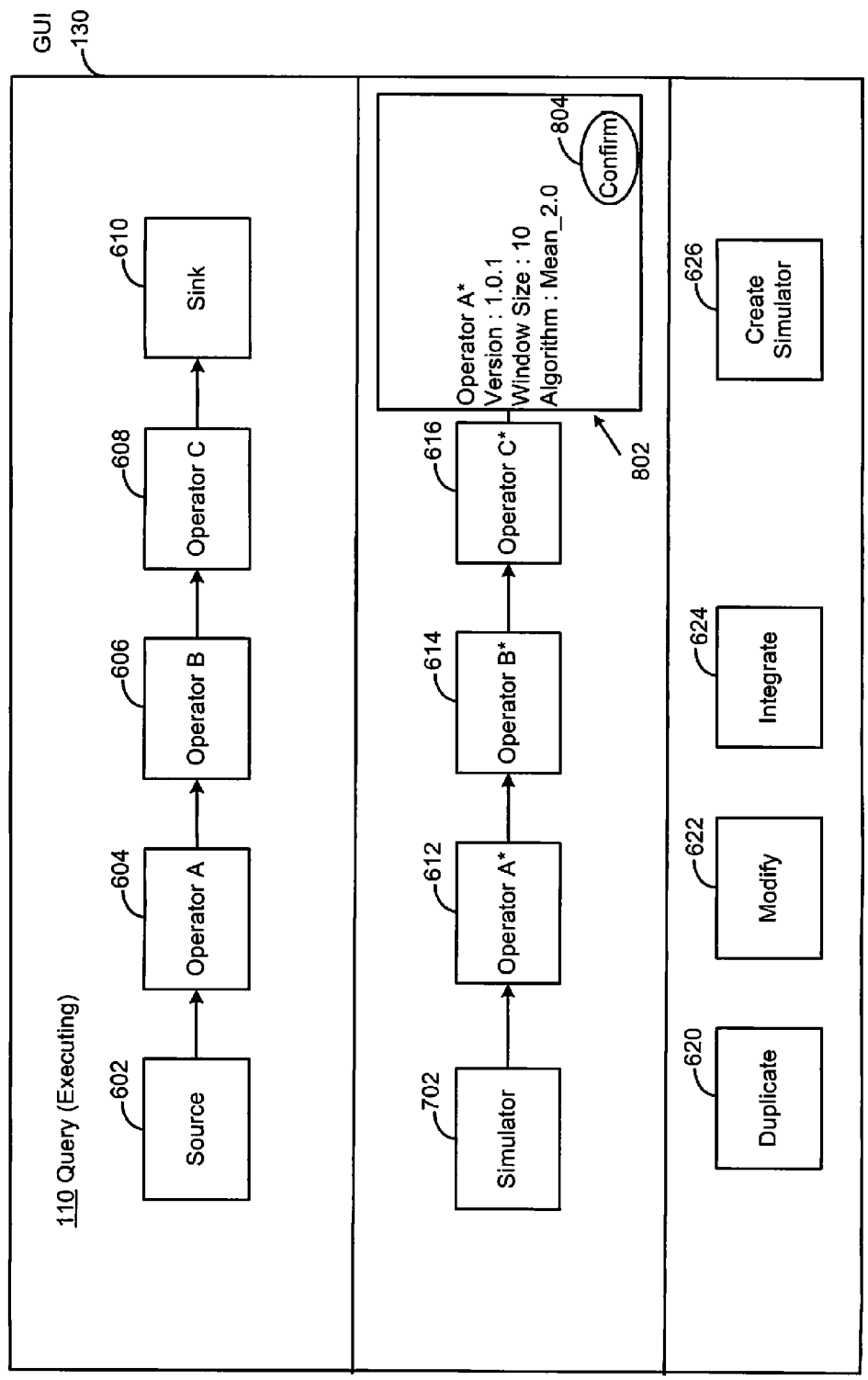
FIG. 8 is a third screenshot of a graphical user interface that may be used with the systems of FIGS. 1 and 4.

Then, in FIG. 8, the user may select the duplicated operator 612 for modification, e.g., by first selecting the modify button 622, and then selecting the duplicated operator 612. At this point, a pop-up window 802 or other mechanism may be provided to the user for illustrating changeable characteristics (e.g., parameters/algorithms) of the duplicated operator 612.

In the example of FIG. 8, the window 802 illustrates a version (1.0.1), window size ("10," e.g., values or time units) and algorithm (e.g., mean 2.0) of the duplicated operator 612. Specifically, it may occur as referenced above that a user may wish to change a window size of a particular operator. Thus, it may occur that an original window size of the duplicated operator 612 may initially be set to 5 values or time units, so that the window 802 illustrates a change by the user of the window size to the illustrated 10 values or time units. Of course, other modifications may be made, such as a change of the illustrated algorithm. Then, such changes may be tracked by way of changing a version number of the operator, as shown in the window 802. As shown, a confirm button 804 or other appropriate mechanism (UI element) may be used to confirm/finalize the selection/modification and close the window 802.

Figure 9:
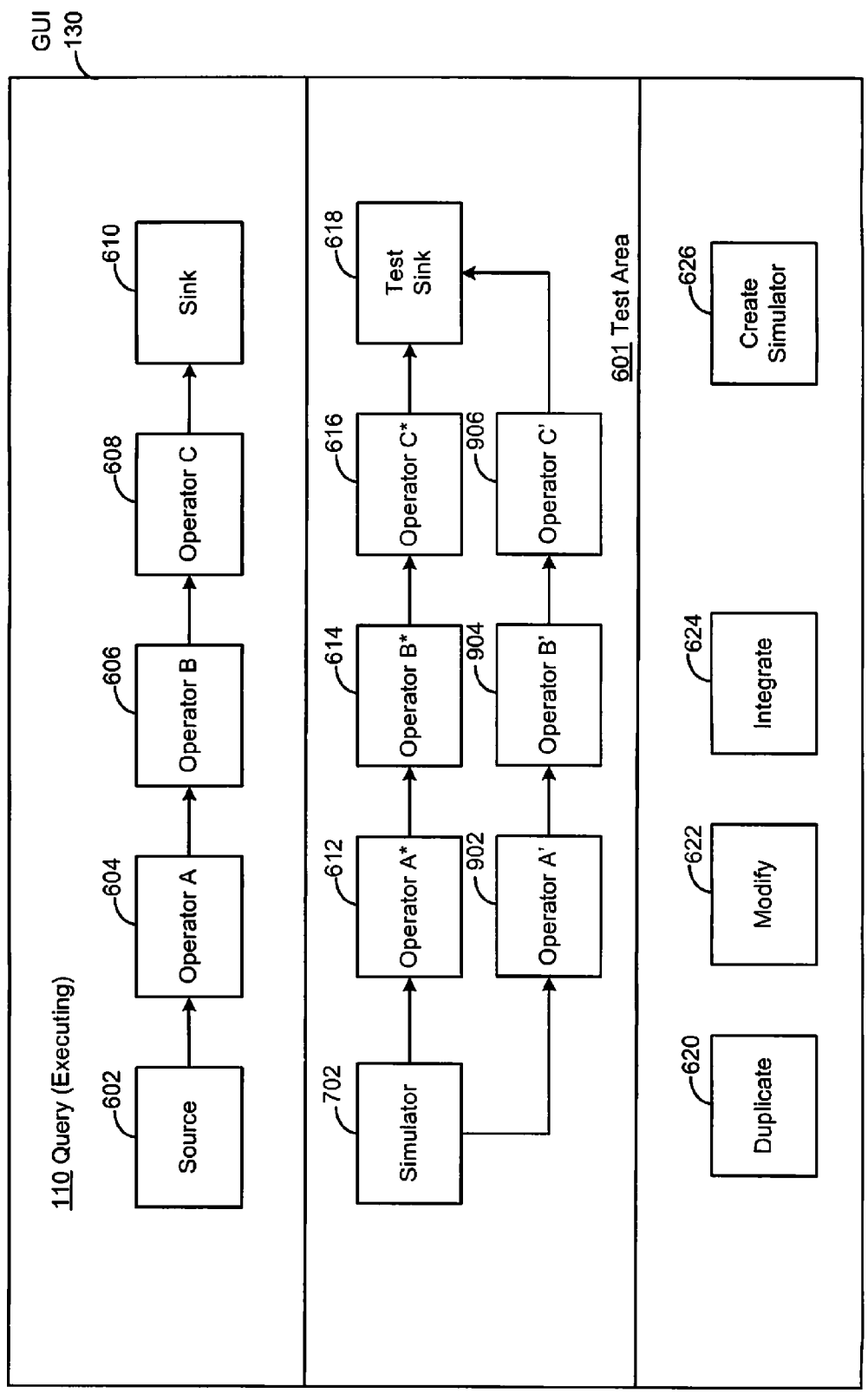
FIG. 9 is a fourth screenshot of a graphical user interface that may be used with the systems of FIGS. 1 and 4.

In FIG. 9, an example is given in which the duplicate button 620 and modify button 622 may be used again to create a second duplicated query including operators 902, 904, 906, which are coupled to the simulator 702 and the test sink 618, as shown. In this way, as just referenced above with respect to FIG. 5, the second duplicated query operators 902, 904, 906 may be maintained identically to the corresponding operators 604, 606, 608. Consequently, a meaningful comparison(s) may be made between simulated original results from the operators 902, 904, 906 and the simulated modified results available from the operators 612, 614, 616. It will be appreciated that various modifications may continue to be made of the operators 612, 614, 616 until an optimization is considered to be achieved, based on the comparison(s).

Once it is decided that integration will proceed with the modified operator 612, then duplication of the state data (i.e., stored original stream data) of the operator 604 may occur to achieve duplicated stream data to take the place of simulated stream data of the operator 612 obtained from the simulator 702. Of course, in other implementations, such duplication may already have occurred as part of the duplication process(es).

Then, in FIG. 10, the integrate button 624 may be used to integrate the now-modified operator 612 into the original query 110 to obtain the integrated query. Specifically, as shown, the operator 612 may be decoupled from its predecessor element (the simulator 702). Similarly, the operator 604 may be decoupled from its predecessor element (the source 602) and its successor element (the operator 606). Finally, the operator 612 may be coupled to the source 602 as its predecessor element, and to the operator 606 as its successor element. The operator 604 may be discarded or maintained, as desired.

It will be appreciated that such de-coupling and coupling may occur through the use of appropriate pub/sub mechanisms. For example, the operator 612 may be altered to publish to the operator 606. In this way, the operator 606 need not be changed or altered in any way in order to continue its previously-programmed operations.

Although certain specific examples have been described, it will be appreciated that many additional or alternative implementations will be apparent to one of skill in the art. For example, in order to track changes, every modification may be provided with a new version, as described above, and a global change log may collect all such information about changes. The log may be used to point out changes at the assessment of data and for analyzing the system's behavior. For such assessment, not only modifications on the considered operator may be important, but also modifications on predecessor operators or composition changes. Information may be recorded automatically, e.g. considered operator, kind of modification, time, and conditions before and after the modification.

It may occur that changing an operator may influence other operators. For example, in the predictive maintenance scenario described above in FIG. 3, the modification of the window size in the first operator 112 may require a change of the threshold in the succeeding operator 116. In these and related cases, user support may be provided regarding possible consequences of desired modifications.

With regard to the GUI 130 or other user interface(s), it may be appreciated in general that in order to support the user query trees, data, and information about changes may be visualized. In the interfaces of FIGS. 6-10 or similar interfaces, different views may be used for different tasks or phases, e.g. design time, runtime, replay, or analysis. For a graphical representation of the queries such as shown in FIGS. 6-10, an abstraction layer may be used that stores metadata about the queries, their composition, and operators. The user's tasks, such as dynamic modification of parameters or code insertion, may be facilitated.

In the production context, the transfer of an optimized query to identical machines may be executed advantageously. A comprehensive user interface may also be configured to duplicate multiple queries, schedule changes for the future, update an algorithm in many operators, or undo changes.

With regard to state transfer, it may occur that an effectively instantaneous, single-step state transfer may be executed. As referenced above, a time-consuming state transfer may use the idle time of an operator for transferring the state. For equidistant data streams, the transfer performance may be predictable. When data arrives randomly, like in event streams, a prediction may be more difficult. Boundary conditions for the state transfer are, for instance, amount of data, length of idle time, and transfer speed. In addition to the sliding window operators, other operators may be considered. Such operators may have different states and thereby other state transfer methods.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   non-transitory computer-readable storage medium including instructions executable by the at least one processor, the instructions configured to implement,
   a request handler configured to determine a query of a Data Stream Management System (DSMS), the query using original stream data stored in a buffer associated with the query, the stored original stream data being obtained from stream data received from at least one data source and being removed from the buffer in association with new stream data being received, wherein the query includes at least one operator being configured to execute the query within the DSMS;

a duplication manager configured to duplicate the at least one operator to obtain at least one duplicated operator, and configured to duplicate the stored original stream data to obtain duplicated stream data for storage within a duplication buffer;

a modification manager configured to modify the at least one duplicated operator to obtain at least one modified operator and to obtain a modified query;

an execution manager configured to determine original results based on execution of the at least one operator, and configured to determine modified results based on execution of the at least one modified operator, the execution manager configured to determine the original results and the modified results in parallel for at least a portion of time; and an integration manager configured to replace the at least one operator and the original stream data with the at least one duplicated operator and the duplicated stream data, respectively, based on the modified results and the original results, to obtain an integrated query for execution within the DSMS.

2. The system of claim 1 wherein the modification manager is configured to modify the at least one duplicated operator to obtain modified stream data, including modifying the at least one duplicated operator by modifying a parameter according to which the stream data is collected.

3. The system of claim 2 wherein the modification manager is configured to modify the at least one duplicated operator including modifying the parameter including altering a window size of the at least one duplicated operator over which the modified stream data is collected by the modified operator within the duplicated buffer.

4. The system of claim 1 comprising a simulation manager configured to provide simulated stream data to the at least one modified operator, wherein the execution manager is configured to determine the original results based on execution of the at least one operator using original stream data, and configured to determine the modified results based on execution of the at least one modified operator using the simulated stream data.

5. The system of claim 1 wherein the duplication manager is configured to provide at least a first duplicate and a second duplicate of the at least one operator, and wherein the modification manager is configured to modify the second duplicate to obtain the at least one modified operator.

6. The system of claim 5 comprising a simulation manager configured to provide simulated stream data to the first duplicate and the at least one modified operator, wherein the execution manager is configured to determine the original results based on execution of the at least one operator using the first duplicate, and configured to determine the modified results based on execution of the at least one modified operator.

7. The system of claim 1 wherein the modification manager is configured to modify the at least one duplicated operator including exchanging an algorithm of the at least one operator with a different algorithm.

8. The system of claim 1 wherein the modification manager is configured to modify the at least one duplicated operator including introducing a new algorithm during a runtime of the system.

9. The system of claim 1 wherein the modification manager is configured to modify the at least one duplicated operator including replacing the at least one operator with at least one new operator as the at least one modified operator.

10. The system of claim 1 wherein the modification manager is configured to modify the at least one duplicated operator including modifying an operational order of the at least one duplicated operator within the plurality of operators.

11. The system of claim 1 wherein the request handler is configured to receive a user selection of the query and of the at least one operator from a graphical user interface, and the execution manager is configured to provide the original results and the modified results using the graphical user interface, and the integration manager is configured to initiate and execute the integrated query based on instruction received from the graphical user interface.

12. The system of claim 1 wherein the duplication manager is configured to duplicate the stored original stream data during an idle time of the system.

13. The system of claim 1 wherein the operators execute the query in collaboration with one another including using a publish-subscribe mechanism.

14. The system of claim 1 wherein the execution manager is configured to provide the original results based on execution of the at least one operator using the original stream data, and configured to provide the modified results based on execution of the at least one modified operator using the duplicated stream data.

15. A computer-implemented method performed by at least one processor, the method comprising:

determining, by the at least one processor, a query of a Data Stream Management System (DSMS), the query currently being executed using stored original stream data within a buffer associated with the query, the stored original stream data being obtained from stream data periodically received from at least one data source and being removed from the buffer in association with new stream data being received, wherein the query includes at least one operator being configured to execute the query within the DSMS;

duplicating, by the at least one processor, the at least one operator to obtain at least one duplicated operator; duplicating the stored original stream data to obtain duplicated stream data for storage within a duplication buffer;

modifying, by the at least one processor, the at least one duplicated operator to obtain at least one modified operator and to obtain a modified query;

determining, by the at least one processor, original results based on execution of the at least one operator;

determining, by the at least one processor, modified results based on execution of the at least one modified operator including determining the original results and the modified results in parallel for at least a portion of time; and replacing, by the at least one processor, the at least one operator and the original stream data with the at least one duplicated operator and the duplicated stream data, respectively, based on the modified results and the original results, to obtain an integrated query for execution within the DSMS.

16. The method of claim 15 wherein modifying the at least one duplicated operator to obtain at least one modified operator and to obtain a modified query comprises: modifying the at least one duplicated operator including modifying a manner in which the stream data is collected.

17. The method of claim 15 wherein determining the modified results comprises:

providing simulated stream data to the at least one modified operator; and determining the modified results based on execution of the at least one modified operator using the simulated stream data.

18. The method of claim 15 wherein determining the original results is based on execution of the at least one operator using the original stream data, and wherein determining the modified results is based on execution of the at least one modified operator using the duplicated stream data.

19. A non-transitory computer-readable medium having a computer program product embodied therein and comprising instructions that, when executed, are configured to cause a data processing apparatus to:

- determine a query of a Data Stream Management System (DSMS), the query using original stream data stored within a buffer associated with the query, the stored original stream data being obtained from stream data received from at least one data source and being removed from the buffer in association with new stream data being received, wherein the query includes at least one operator being configured to execute the query within the DSMS;
- duplicate the at least one operator to obtain at least one duplicated operator;
- duplicate the stored original stream data to obtain duplicated stream data for storage within a duplication buffer;
- modify the at least one duplicated operator to obtain at least one modified operator and to obtain a modified query;
- determine original results based on execution of the at least one operator;
- determine modified results based on execution of the at least one modified operator including determine the original results and the modified results in parallel for at least a portion of time; and
- replace the at least one operator and the original stream data with the at least one duplicated operator and the duplicated stream data, respectively, based on the modified results and the original results, to obtain an integrated query for execution within the DSMS.

20. The non-transitory computer-readable medium of claim 19 wherein the instructions further cause the data processing apparatus to:

- provide simulated stream data to the at least one modified operator; and
- determine the modified results based on execution of the at least one modified operator using the simulated stream data.

21. The non-transitory computer-readable medium wherein the instructions further cause the data processing apparatus to:

- determine the original results based on execution of the at least one operator using the original stream data; and
- determine the modified results based on execution of the at least one modified operator using the duplicated stream data.

* * * * *